United States Patent [19]
Bestler et al.

[11] Patent Number: 5,570,347
[45] Date of Patent: Oct. 29, 1996

[54] UPSTREAM DATA TRANSMISSION SYSTEM WITH DOWNLOADABLE TRANSMISSION PARAMETERS

[75] Inventors: Caitlin B. Bestler, Chicago; Khosro M. Rabii, Arlington Heights, both of Ill.

[73] Assignee: Zenith Electronics Corporation, Glenview, Ill.

[21] Appl. No.: 384,904

[22] Filed: Feb. 7, 1995

Related U.S. Application Data

[63] Continuation-in-part of Ser. No. 337,796, Nov. 14, 1994, abandoned.

[51] Int. Cl.$^6$ .................................................. H04N 7/14
[52] U.S. Cl. .................. 370/17; 370/79; 370/85.2; 370/85.7; 370/105.2; 370/105.4; 375/257; 455/5.1; 348/12; 348/13
[58] Field of Search .................................... 370/17, 24, 29, 370/30, 50, 71, 73, 124, 79, 85.1, 85.2, 85.3, 85.7, 85.9, 95.1, 100.1, 105.2, 105.4; 375/257; 455/3.1, 5.1; 348/6, 10, 12, 13, 16, 17

[56] References Cited

U.S. PATENT DOCUMENTS

| | | | |
|---|---|---|---|
| 4,528,663 | 7/1985 | Citta | 370/94 |
| 4,553,161 | 11/1985 | Citta | 358/84 |
| 4,633,462 | 12/1986 | Stifle et al. | 455/5.1 X |
| 5,012,469 | 4/1991 | Sardana | 370/95.3 |
| 5,150,247 | 9/1992 | Sharpe et al. | 359/135 |
| 5,295,140 | 3/1994 | Crisler et al. | 370/94.1 |
| 5,361,394 | 11/1994 | Shigihara | 455/5.1 |

*Primary Examiner*—Benedict V. Safourek
*Assistant Examiner*—Russell W. Blum

[57] ABSTRACT

Each of a plurality of terminals in a two-way communications system includes a series of counters establishing a plurality of time slots synchronized to a downstream reference parameter. Upstream transmissions are effected by each terminal in one or more of the time slots which are defined by a downloaded message as comprising either a reserved slot or a contention slot. The downloaded message, which may also establish terminal transmission power levels and retransmission backoff algorithms for contention time slots, is derived on the basis of the population of subscriber terminals and the usage of the upstream channel.

31 Claims, 5 Drawing Sheets

UPSTREAM DATA TRANSMISSION SYSTEM WITH DOWNLOADABLE TRANSMISSION PARAMETERS

REFERENCE TO RELATED APPLICATION

This application is a continuation-in-part of application Ser. No. 08/337,796, filed Nov. 14, 1994, now abandoned.

FIELD OF THE INVENTION

This invention relates generally to upstream data transmission in a two-way cable system and particularly to a system for generating transmission time slots for upstream data transmission.

BACKGROUND OF THE INVENTION

Cable television systems utilize a central provider of program information which services a large number of end users generally referred to as subscribers. The central provider portion of the cable television system usually called the "headend" provides a plurality of program information as well as other information to the subscribers via a multiple branch distribution network which may define several tiers of distribution facilities.

In addition to actual programming information, the cable television system is required to carry additional management and operating data provided by the headend to the large number of end users or subscribers. Communication from the headend to the subscribers is generally referred to as "downstream" communication. In some cable television systems referred to as one-way, all information and data is transferred downstream. In other cable television systems referred to as two-way systems, communication is also provided from the various subscribers throughout the network to the headend in what is referred to as "upstream" communication. Examples of subscriber originated upstream information may include program purchasing requests, opinion poll responses, and subscriber terminal status information. Upstream communication in cable television systems is provided using out-of-band communication. Such out-of-band communication uses a separate communication capability outside the standard television broadcast channel and thus is not limited to the vertical blanking interval or other time restraint. Instead, a separate carrier, usually between five and thirty megahertz, is modulated with upstream data at the decoder and transmitted to the headend.

Upstream communications are typically effected using either a contention protocol as disclosed in U.S. Pat. Nos. 4,528,663 and 4,553,161 wherein the subscriber's contend for access to the upstream channel or by providing each subscriber with guaranteed access to a respective relatively small portion of the upstream spectrum. Depending on the type and quantity of usage, one protocol may be more advantageous than the other, or a mixture of both may provide the most effective performance.

It is a general object of the present invention to provide an improved upstream data transmission system for cable television. It is a more particular object of the present invention to provide an improved upstream data transmission system for cable television which is able to respond dynamically to operating changes within the cable television system using headend controlled programmable system parameters.

BRIEF DESCRIPTION OF THE DRAWINGS

The features of the present invention, which are believed to be novel, are set forth with particularlity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
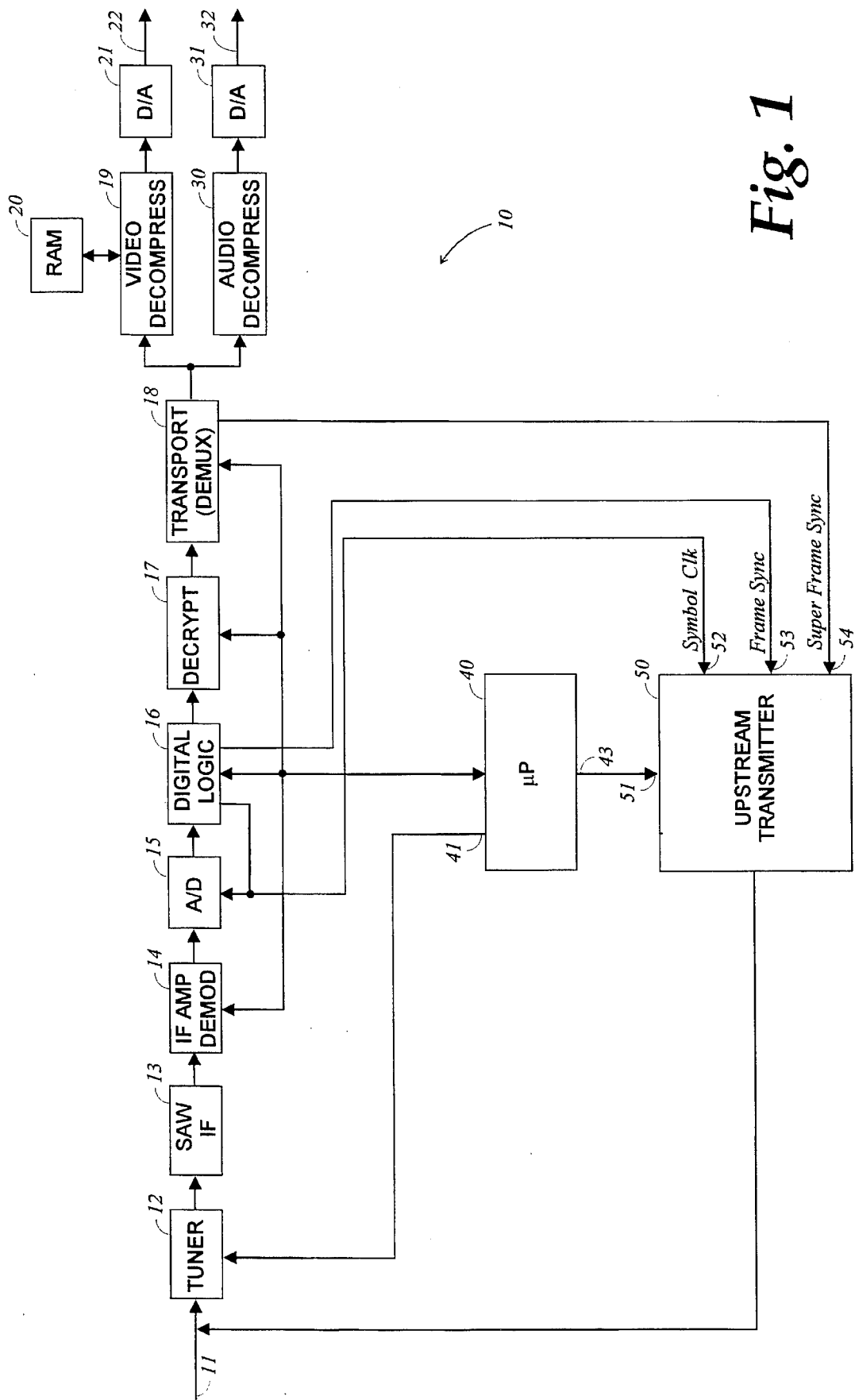
FIG. 1 sets forth a general block diagram of a cable television subscriber decoder constructed in accordance with the present invention.

FIG. 1 sets forth a block diagram of a cable television subscriber terminal constructed in accordance with the present invention and generally references by numeral 10. Subscriber terminal 10 includes a tuner 12 coupled to a cable television distribution system (not shown) by a cable 11. The output of tuner 12 is coupled to an intermediate frequency filter 13 and thereafter to the input of an intermediate frequency amplifier and demodulator circuit 14. The output of demodulator 14 is coupled to an analog to digital converter 15, the output of which is coupled to the input of a digital logic circuit 16. A decryption circuit 17 receives the output of logic circuit 16 and is coupled to a transport demultiplexor circuit 18. The outputs of demultiplexor 18 are coupled to respective video and audio decompression circuits 19 and 30. Video decompression circuit 19 includes a random access memory 20 coupled thereto. The output of video decompression circuit 19 is coupled to a digital to analog converter 21 having an output 22 which is coupled to a video display. Correspondingly, the output of audio decompression circuit 30 is coupled to a digital to analog converter 31 having an output 32 coupled to an audio system.

Subscriber terminal 10 further includes a microprocessor 40 having a channel selection output 41 coupled to tuner 12 and having a bi-directional data coupling to demodulator 14, digital logic circuit 16, decryption circuit 17 and demultiplexor 18 (by which downstream data is downloaded to the microprocessor). Subscriber terminal 10 further includes an upstream transmitter 50, the structure of which is set forth below in FIG. 2 in greater detail. Upstream transmitter 50 includes an input 51 coupled to output 43 of microprocessor 40 together with a symbol clock input 52 coupled to logic circuit 16, a frame sync signal input 53 also coupled to digital logic circuit 16, and a superframe synchronization signal input 54 coupled to demultiplexor 18.

In operation, a plurality of broadcast signals are coupled by cable 11 to the input of tuner 12 which in response to a channel selection signal supplied by microprocessor 40 couples a selected signal to intermediate frequency filter 13. Filter 13 may be constructed in accordance with conventional fabrication techniques and may, for example, include a conventional surface acoustic wave filter or its equivalent. The output of filter 13 is demodulated by intermediate frequency amplifier and demodulator circuit 14. Demodulator 14 may be constructed in accordance with conventional fabrication techniques and may, for example, include a synchronous demodulator. The essential function of demodulator 14 is to recover the baseband analog signal modulated upon the carrier selected by tuner 12. While different transmitting signal formats and methods may be utilized in communicating data through a cable television system, the example shown in FIG. 1 utilizes a digital vestigial sideband system in which N-level symbols having a symbol rate of approximately 10.76 megahertz are transmitted and received together with a data frame sync signal having a frequency of approximately 41.2 kilohertz resulting in data frames of approximately 24.3 milliseconds in duration. The demodulated baseband analog signal at the output of demodulator 14 comprises successive N-level symbols equally spaced by the period of the symbol clock signal. The analog to digital conversion performed by converter 15 is clocked at the symbol clock frequency to accurately recover the amplitudes of each symbol in the form of a multibit value. The output of converter 15 is processed by digital logic circuit 16 to recover the frame sync signal in synchronism with the received frame and to generate the symbol clock signal for operating converter 15. The output data signal of digital logic circuit 16 typically comprises compressed video and audio information and is further processed by decryption circuit 17 and thereafter demultiplexed in demultiplex circuit 18 to provide input video and audio signals to decompression circuits 19 and 30 respectively. Circuits 19 and 30 perform conventional video and audio decompression operations upon the applied video and audio data to produce decompressed video and audio signals which are converted to corresponding analog signals within digital to analog converters 21 and 31. The analog signals thus provided are applied to the video display and audio system (not shown) respectively.

The structure of upstream transmitter 50 is set forth below in FIG. 2 in greater detail. However, suffice it to note here that in accordance with the present invention, upstream transmitter 50 is coupled to cable 11 for upstream transmission and operates in response to a symbol clock input at input 52 from digital logic circuit 16 together with a frame sync signal input at input 53 also received from digital logic circuit 16. Upstream transmitter 50 further responds to a superframe sync signal at input 54 which is provided by transport and demultiplexor 18. In further accordance with the present invention, a programmable width signal is coupled from output 43 of microprocessor 40 to input 51 of upstream transmitter 50. Upstream transmitter 50 utilizes the width signal, the superframe sync signal, the symbol clock and the frame sync signal to properly time upstream communication applied to cable 11 from subscriber terminal 10 by generating a plurality of message transmission time slots each of which may be uniquely assigned to a respective subscriber or which may be used as a contention time slot. In accordance with an important aspect of the present invention set forth below in greater detail, the width and timing location of the time slots for subscriber terminal 10 as well as all other subscriber terminals on the cable television system is programmably controllable by the headend manipulation of the width and superframe sync signals applied to the subscriber terminals. Thus, in accordance with the present invention, the time slots for each subscriber terminal are programmably controlled from the headend to accommodate dynamic changes within the cable television system, including establishing the time slots as contention or reserved and controlling the width and number of the slots.

In accordance with an important aspect of the present invention, the upstream carrier signals and time slots are synchronized with the symbol clock. This allows the use of a plurality of upstream carrier signals at different frequencies which are all locked to the symbol clock which makes the most efficient use of the available upstream bandwidth. Thus, with each carrier signal locked to a common reference, different subscriber terminals may readily transmit at different upstream carrier frequencies.

In addition, because the symbol clock is used in creating the subscriber time slots, the proper relative timing between time slots at each subscriber terminal is assured. That is to say, all time slots are synchronized to the common reference of the symbol clock.

Figure 2:
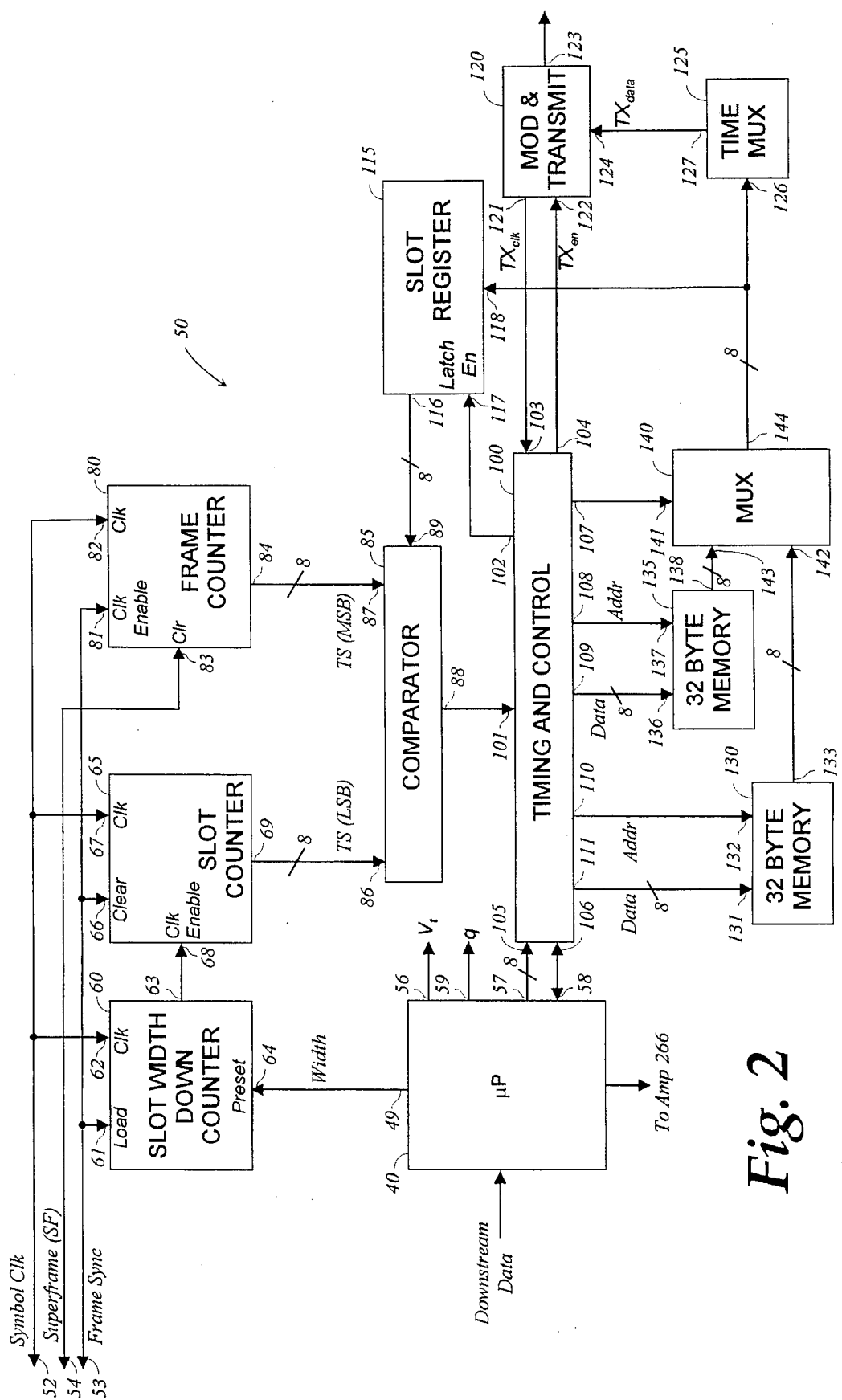
FIG. 2 sets forth a block diagram of the upstream transmitter of the present invention upstream data transmission system.

FIG. 2 sets forth a block diagram of upstream transmitter 50 shown in FIG. 1. Upstream transmitter 50 includes a slot width down counter 60 having a load input 61, a clock input 62, an output 63 and a preset input 64. A slot counter 65 includes a clear input 66, a clock input 67, a clock enable input 68 and an output 69. A frame counter 80 includes a clock enable input 81, a clock input 82, a clear input 83 and an output 84. Symbol clock input 52 (corresponding to the downstream symbol rate) is coupled to clock input 62 of counter 60, clock enable input 67 of counter 65 and clock input 82 of counter 80. Superframe sync input 54 is coupled to clear input 83 of counter 80. A frame sync input 53 (corresponding to the downstream data frame sync signal) is coupled to load input 61 of counter 60, clear input 66 of counter 65 and clock input 81 of frame counter 80. Output 63 of counter 60 is coupled to clock input 68 of slot counter 65.

Microprocessor 40 includes an output 49 coupled to preset input 64 of counter 60. Microprocessor 40 further includes a tuning voltage output 56, a q signal output 59, a data output 57 and a status signal coupling 58. A comparator 85 includes an input 86 coupled to output 69 of counter 65, an input 87 coupled to output 84 of frame counter 80, an input 89, and an output 88. A timing and control circuit 100 includes an input 101 coupled to output 88 of comparator 85, an output 102, and a transmission clock signal input 103. Timing and control circuit 100 further includes a data input 105 coupled to data output 57 of microprocessor 40 and an input 106 coupled to status line input 58 of microprocessor 40. Timing and control circuit 100 also includes a data output 111 and an address output 110 coupled to inputs 131 and 132 of a memory 130. Timing and control circuit 100 further includes a data output 109 and an address output 108 coupled to inputs 136 and 137 respectively of a memory 135. A multiplex circuit 140 includes an input 141 coupled to output 107 of circuit 100, inputs 142 and 143 coupled to outputs 133 and 138 of memories 130 and 135 respectively, and an output 144. A slot register 115 includes an output 116 coupled to input 89 of comparator 85, an enable input 117 coupled to output 102 of circuit 100, and an input 118 coupled to output 144 of multiplex 140. A time multiplex circuit 125 includes an input 126 and an output 127. A transmission modulator 120 includes a transmission clock output 121 coupled to input 103 of circuit 100 and a transmission enable input 122 coupled to output 104 of timing and control circuit 100. Transmission modulator 120 further includes a transmission data input 124 coupled to output 127 of multiplex circuit 125 and an output 123 coupled to cable 11 (seen in FIG. 1).

In operation, processor 40 provides a programmable slot width number to preset input 64 of down counter 60. Down counter 60 responds to the next frame sync signal applied to load input 61 to set down counter 60 to the programmable slot width number. Thereafter, down counter 60 responds to symbol clock signals at input 62 to count downwardly from the slot width number and produces an output signal at output 63 each time a zero count is obtained. Thereafter, slot width down counter 60 recycles producing a plurality of successive output signals at output 63 each of which corresponds to the time interval in which counter 60 counts downwardly from the programmable slot width number. The succession of outputs from slot width counter 60 is applied to clock enable input 68 of counter 65 which is cleared each time a frame sync signal is applied to clear input 66. Counter 65 responds to the applied clock signals to produce an output count at output 69 synchronously with the symbol clock which corresponds to the sequentially established time slots created by slot width counter 60. Thus, the output of slot counter 65 at output 69 provides a time slot identifying number which is applied to input 86 of comparator 85. Frame counter 80 receives frame sync signals at clock enable input 81 to produce an output count at output 84 synchronously with the symbol clock which corresponds to the number of frame sync intervals which have occurred following the most recent superframe sync signal. The output count of frame counter 80 is coupled to input 87 of comparator 85.

Thus, the output of counter 65 comprises a succession of eight-bit slot identifying numbers occurring within each data frame sync interval. Correspondingly, the output of frame counter 80 comprises an eight-bit running count identifying each successive frame which has occurred following the previous superframe sync signal. As a result, the combination of eight-bit output counts of counters 65 and 80 when combined form a 16-bit number which identifies a plurality of periodically recurring time slots coextensive with one or more data frames of the received vestigial sideband signals. Each time slot therefore is uniquely identified by the combined number formed by the outputs of counters 65 and 80 in which the output of counter 65 forms the eight least significant bits of the number while the output of counter 80 forms the eight most significant bits of the time slot identifying number. This combined number is utilized by comparator 85 to provide sequential identification of each time slot within each super frame as the vestigial sideband signal is received.

In further accordance with the present invention, each subscriber terminal within the network may be assigned a unique time slot or a contention time slot for upstream data transmission. Such assignments are made by downloading one or more time slot numbers to microprocessor 40 which can be used by the subscriber terminal for upstream transmissions as described in further detail hereinafter. A uniquely assigned time slot (sometimes referred to as a reserved time slot) can, of course, only be used by the respective subscriber terminal and thereby guarantees access to the network. On the other hand, all subscriber terminals may attempt upstream transmissions during contention time slots, a successful transmission resulting in the receipt of an "Acknowledge" signal by the terminal. In the case of an unsuccessful transmission, the message is normally retransmitted in a subsequent contention slot defined by a so-called "back-off" algorithm which may also be downloaded in microprocessor 40 by the network.

Upstream transmitter 50 initiates upstream data transmission by initially transferring a sixteen-bit time slot identifying number (which may represent either a reserved or contention time slot) to memory 130 through timing and control circuit 100. In transferring the sixteen-bit time slot identifying number to memory 130, the eight least significant bits and eight most significant bits are preferably loaded into different memory location to be accessed separately. The remaining memory locations within memory 130 are filled with the data to be transmitted upstream (which is also transferred to the memory through timing and control circuit 100). Thereafter, the eight most significant bits which correspond to the frame identifying portion of the time slot identifying number are coupled from memory 130 by multiplexor 140 to slot register 115. Comparator 85 generates an internal match signal when the eight most significant bits of the time slot identifying number at input 89 match the eight most significant bits from counter 80. In response thereto, the eight least significant bits comprising the time slot identifying number from memory 130 are coupled through multiplexor 140 to slot register 115. Thereafter, slot register 115 applies the eight least significant bits to input 89 of comparator 85. Comparator 85 performs a comparison of the eight least significant bits of the time slot identifying number at input 89 to the current eight least significant bits at input 86 and produces an output signal at output 88 when a match occurs. In response to the match signal, timing and control circuit 100 then causes the stored data within memory 130 to be outputted to multiplexor 140 and thereafter to time multiplexor 125. Multiplexor 125 converts the data to a serial data stream which is applied to modulator 120 forming the transmission data. Concurrently, timing and control circuit 100 enables transmission modulator 120 causing the serial bit stream of transmission data to be transmitted upstream upon cable 11 (seen in FIG. 1) during the respective time slot.

To further enhance the effectiveness of upstream transmitter 50, a second memory 135 identical to memory 130 and coupled to data and address outputs 109 and 108 respectively is also coupled to multiplex circuit 140. The purpose of providing memory 135 is to utilize an alternating memory access for timing and control circuit 100 in which one memory may be loaded with data while the other is outputting data to transmit upstream. This improves the effectiveness and throughput capability of the present invention system.

The operation of transmission modulator 120 is set forth below in greater detail. However, suffice it to note here that the serial data stream of transmission data is suitably modulated upon a carrier signal within the allowable range of upstream communication frequencies for processing by the cable system headend.

Figure 3:
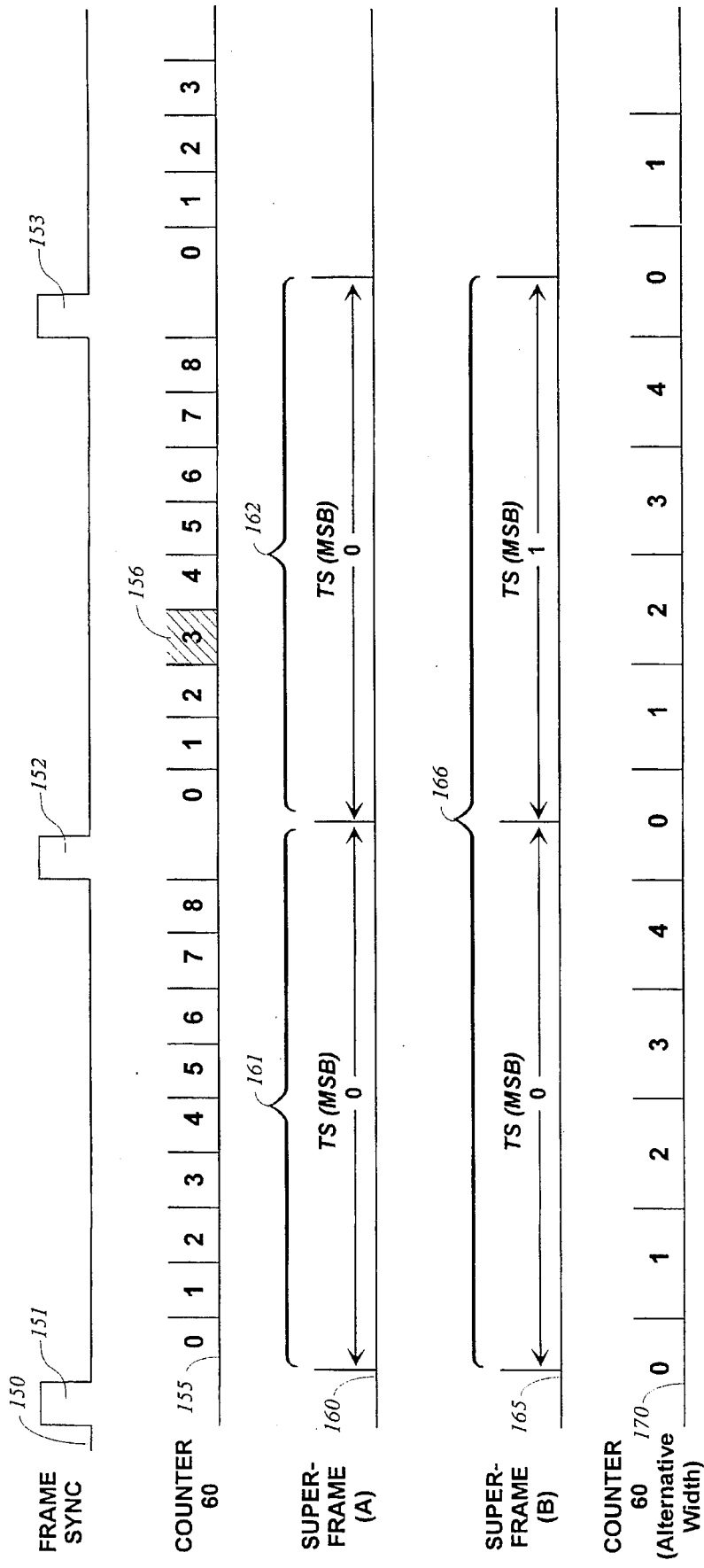
FIG. 3 sets forth exemplary timing diagrams illustrating the operation of the present invention upstream data transmission system.

FIG. 3 sets forth exemplary timing diagrams illustrative of the operation of the present invention upstream data transmission system. For purposes of references, a frame sync signal 150 comprises a plurality of periodic reference sync signals such as pulses 151, 152, and 153 occurring at the beginning of each data frame. Pulses 151 through 153 correspond to recognizable symbol combinations within the transmitted downstream data frame which are recognized as frame sync signals. Timing diagram 155 illustrates a plurality of time slots formed by slot width counter 60 and slot counter 65 utilizing a programmable slot width number which divides each frame sync interval into eight time slots. Thus, as can be seen in diagram 155, eight time slots (corresponding to the output of slot counter 65) are created within each interval between successive frame sync signals such as signals 151 through 153. A pair of alternative superframe sync signals 160 and 165 are shown for purposes of comparison and illustration. However, it will be apparent to those skilled in the art that different superframe sync signals may be utilized in accordance with the present invention. For purposes of illustrations, superframe sync signal 160 generally coincides with frame sync signal 150 and thus a plurality of superframe sync intervals 161, 162 and so on are formed which generally coincide with frame sync intervals. Alternatively, superframe sync signal 165 produces a superframe interval which includes two successive frame sync intervals.

As described above, upstream transmissions from a subscriber terminal are affected within respective time slots represented by a sixteen-bit time slot identifying number having the eight least significant bits identifying the time slot and the eight most significant bits identifying the frame number (i.e. within a given superframe interval). As is also described above, the slot width or number time slots formed within each frame sync interval as well as the number of frames within each superframe interval may be varied to provide the necessary number of time slots for the subscriber terminals within the cable system. Thus, for example, in the event superframe sync signal 160 is used, a total of eight time slots are available. The number of time slots available may be increased by adjusting the programmable slot width number to cycle counter 60 (seen in FIG. 2) more quickly and thereby divide each frame sync interval into a greater number of narrower time slots. Conversely, the programmable slot width number applied to counter 60 in FIG. 2 may be increased to divide each frame sync interval into a smaller number of time slots such as illustrated in timing diagram 170 in which four time slots per frame sync interval are provided. It will be understood by those skilled in the art that while timing diagrams 155 and 170 show alternative time slots numbering eight and four respectively during each frame sync interval, for purposes of illustration, in practice a substantially greater number of time slots per frame sync interval will most likely be utilized to accommodate a large number of subscribers.

Thus, timing diagrams 155 and 170 illustrate the use of different programmable slot width numbers to provide different numbers of available time slots. In addition, the superframe interval may be adjusted to provide additional time slots as the superframe sync interval is lengthened. For example, in the event the slot width number is used which produces timing diagram 155 having eight time slots within each frame sync interval and superframe sync signal 160 is used, a total of eight time slots are provided. If, however, superframe sync signal 165 is utilized a total of sixteen time slots are provided during interval 166 of the superframe sync signal. In such case, the first eight time slots occur within the first frame of the superframe sync interval while an additional eight time slots occur during the second frame sync interval of the superframe signal. Thus, changing from superframe signal 160 to superframe signal 165 doubles the number of time slots available. If, for example, shaded time slot 156 is to be identified, the sixteen-bit time slot identifying numbers would comprise an eight-bit frame count most significant bit number equal to decimal one and an eight-bit slot count least significant bit number equal to decimal three to uniquely identify time slot 156.

As mentioned above, an important objective of the present invention is the utilization of programmable slot width together with programmable superframe signal values to provide dynamic configuration of the present invention upstream data transmission system. Thus, in accordance with the present invention, the headend is able to provide a sufficient number of time slots as system needs change by simply changing either or both the slot width or superframe signal values. As a result, the system is completely flexible and able to accommodate changes in system needs such as an increased number of subscriber terminals or increased usage of the upstream transmission medium.

As mentioned previously, any of the foregoing time slots may be used in a reserved mode wherein a given time slot is reserved only for usage by a particular terminal or in a contention mode wherein all terminals may attempt to use the time slot to gain access to the network, all under supervision of the network controller. In particular, referring to FIG. 5, upstream transmissions from the subscriber terminals are received over cable 11 by a receiver 300 and supplied to a network controller 302. The output of network controller 302 is combined with video and audio data in an inserter/modulator 304 and transmitted in the downstream direction in the format previously described.

Figures 5, 6:
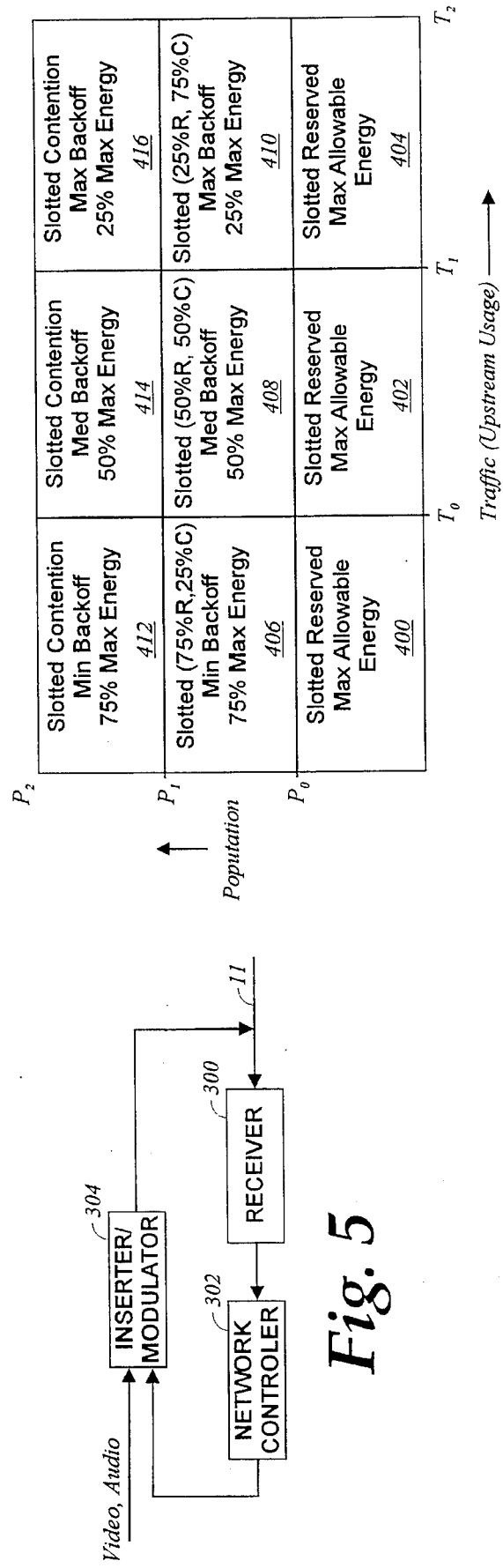
FIG. 5 sets forth a block diagram of the cable system headend of the upstream data transmission system of the invention.
FIG. 6 is a table illustrating a model used by the network controller of FIG. 5 for controlling the operation of the upstream data transmission system of the invention.

Network controller 302 provides various data for downstream transmission including the superframe signal and data defining the modalities of the upstream transmission time slots. The table of FIG. 6 illustrates a simplified strategy which may be used by network controller 302 in defining network time slot modality. Three parameters are considered in the table; upstream transmission power, the nature of the slot (i.e. reserved or contention) and the nature of the back-off algorithm employed for contention slots. In a preferred embodiment of the invention, the transmission medium comprises a hybrid-fiber-coaxial (HFC) transmission network so that instantaneous transmission power must be limited to prevent laser clipping.

Referring in more detail to FIG. 6, assuming a relatively small population of subscriber terminals, i.e. less than Po, and relatively low upstream traffic, i.e. less than To, the most effective upstream transmission scenario is represented by block 400, in which each system subscriber is assigned a unique reserved time slot for upstream transmission at a maximum allowable energy level. Network controller 302 may establish this scenario by providing data for downstream transmission including slot width and superframe signals for establishing an adequate number of upstream transmission time slots (at least one per subscriber terminal) together with data assigning at least one unique time slot for usage by each respective terminal. The same scenario may be used with increased upstream traffic as represented by blocks 402 and 404 since each terminal has its own reserved upstream transmission time slots. In this regard, network controller 302 may determine the extent of upstream traffic as a function of the number of successfully received upstream messages over a given period of time.

As the population of subscriber terminals increases, for example greater than Po but less then P1, it becomes impractical to assign a unique time slot to each terminal. Thus, if upstream traffic is relatively low, as represented by block 406, 75% of the time slots may be assigned for use on a reserved basis while the remaining 25% are designated for contention use. This time slot mix may be achieved, for example, by assigning each terminal the same number of reserved and contention time slots or by skewing the number of reserved slots in favor of terminals having a history of extensive interactive use of the upstream channel. Also, in connection with the contention time slots, data is provided by network controller 302 for downloading a minimum retransmission backoff algorithm and limiting transmission power to 75% of maximum allowable energy. As the upstream traffic increases as represented by block 408 (more than To but less than T1) the time slot mix is changed to 50% reserved and 50% contention. Also, the transmission back-off algorithm for the contention slots is increased to a selected medium value and the transmission power is reduced to 50% of maximum allowable energy. With further increases in upstream traffic as represented by block 410 (more than T1 but less than T2) the transmission mix is further adjusted to provide 25% reserved and 75% contention time slots, with the latter using an increased retransmission back-off algorithm value and 25% maximum allowable energy.

Further increases in subscriber terminal population as represented by blocks 412–416 (more than P1) makes the use of any reserved slots impractical so that all upstream transmission time slots are used in a contention mode. As illustrated in the table, the retransmission back-off increases and the transmission power decreases with increasing upstream traffic.

It will be appreciated that the table of FIG. 6 represents a highly simplified model of the manner in which upstream transmission modes may be varied as a function of terminal population and upstream traffic and that many much more sophisticated models are possible. In addition, various other factors may be considered in defining the model such as the type of service requested. For example, it would be much more advantageous to assign a reserved slot to a terminal for use in playing an interactive game than for ordering a pay-per-view movie.

Figure 4:
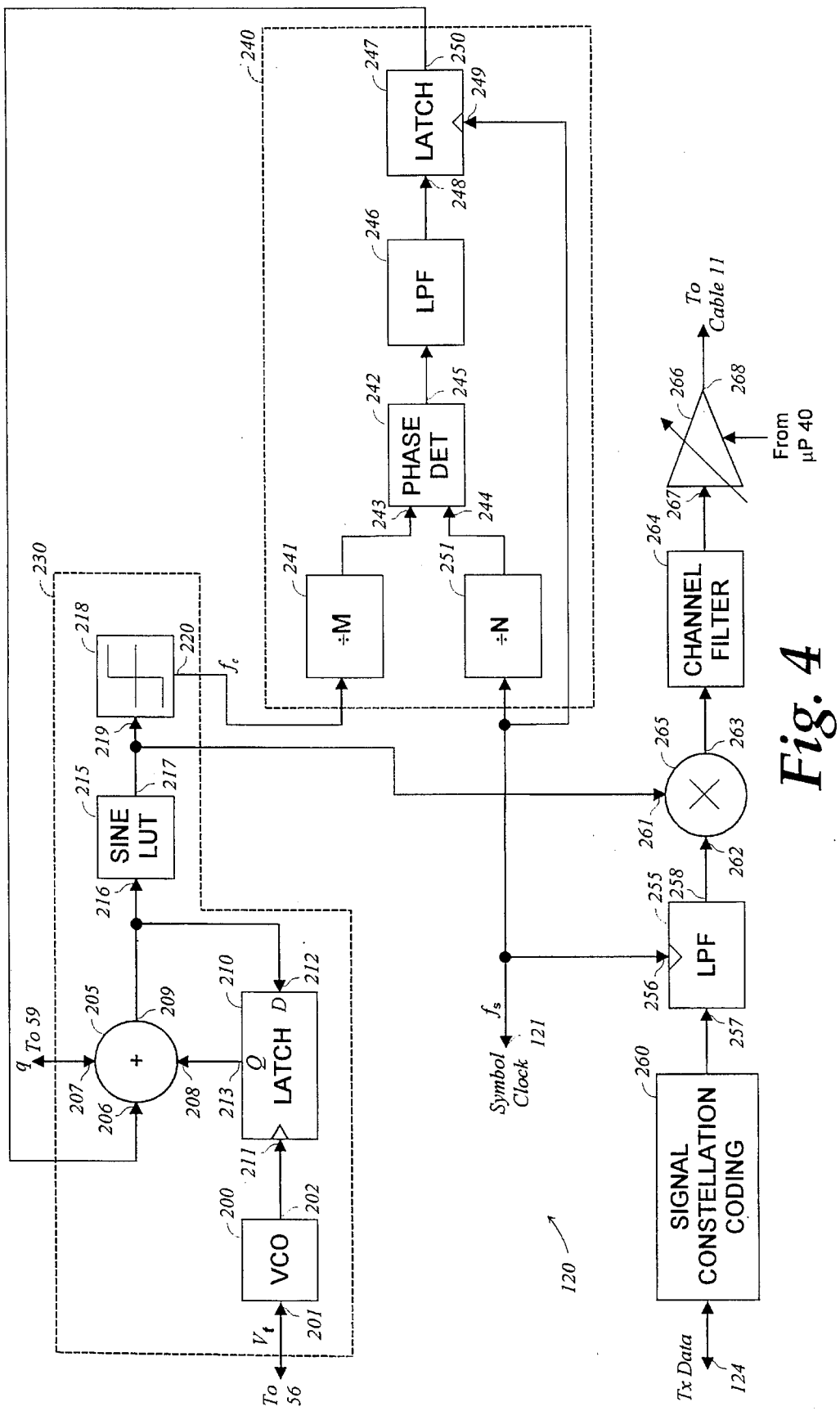
FIG. 4 sets forth a block diagram of the upstream data transmitter of the present invention upstream data transmission system.

FIG. 4 sets forth a block diagram of transmission modulator 120 of FIG. 2 in greater detail. As is seen in FIG. 2, transmission modulator 120 operates to modulate a selected carrier with the upstream data for transmission during a selected time slot to the cable system headend via the system network. The timing of upstream data transmission is controlled by the upstream transmitter shown in FIG. 2 in accordance with the above-described time slot allotment leaving the function of transmission carrier modulation to transmission modulator 120. Thus, transmission modulator 120 utilizes a discrete time oscillator 230 together with a phase lock loop 240 to provide a carrier signal at a selected frequency which is locked to a network reference such as the network symbol clock signal. Modulator 265 receives the generated carrier signal together with the to-be-transmitted data and produces the modulated carrier used for upstream communication.

More specifically, transmission modulator 120 includes discrete time oscillator 230 having a voltage controlled oscillator 200 having a tuning voltage input 201 coupled to output 56 of microprocessor 40 (seen in FIG. 2). Discrete time oscillator 230 further includes a latch circuit 210 having a clock input 211 coupled to output 202 of oscillator 200, a Q output 213 and a D input 212. A summer 205 includes an input 206, an input 207 coupled to output 59 of microprocessor 40, seen in FIG. 2, an input 208 coupled to the Q output 213 of latch 210, and an output 209. Output 209 of summer 205 is coupled to an input 216 of a sine wave lookup table 215. In addition, output 209 is further coupled to the D input 212 of latch 210. Sine lookup table 215 includes an output 217 coupled to an input 219 of a comparator type slicing circuit 218.

Transmission modulator 120 further includes a phase lock loop 240 having a phase detector 242 having inputs 243 and 244 and an output 245. A frequency dividing circuit 241 is coupled between output 220 of slicer 218 and input 243 of phase detector 242. A second frequency dividing network 251 is coupled to input 244 of phase detector 242. Output 245 of phase detector 242 is coupled to an input 248 of a latch circuit 247 via a low pass filter 246. Latch 247 includes a clock input 249 coupled to the input of frequency dividing network 251 and an output 250 coupled to input 206 of summer 205. Transmission modulator 120 includes a clock signal input 121 coupled to the input of frequency divider network 251 and which comprises the symbol clock from input 52 seen in FIG. 2.

As mentioned above, transmission modulator 120 includes an input 124 which receives the serial bit stream of data for upstream transmission. Transmission modulator 120 further includes a signal constellation coding circuit 260 which may for example comprise a conventional byphase shift key coding circuit which appropriately codes the serial bit data steam of upstream transmission data and applies it to an input 257 of a low pass filter 255. Filter 255 includes a clock signal input 256 coupled to symbol clock input 121. Output 258 of low pass filter 255 is coupled to input 262 of modulator 265. Modulator 265 includes an input 261 coupled to output 217 of sine wave lookup table 215 and an output 263. A channel filter 264 couples output 263 to an input 267 of a variable attenuator 266. Attenuator 266, which is controlled by a signal from microprocessor 40 to establish the upstream transmission energy, includes an output 268 coupled to cable 11 (seen in FIG. 1).

In operation, microprocessor 40 (seen in FIG. 2) produces initial values of the tuning voltage and value "q" for application to input 201 of oscillator 200 and to input 207 of summing network 205. These initial values of tuning voltage and input signal "q" to summing network 205 are programmable values selected to generate an output carrier having one of a plurality of frequencies within the upstream communication bandwidth of the system. Typically, such upsteam communications are modulated upon carriers having frequencies within a range of 5–30 Megahertz. Oscillator 200 is a voltage controlled oscillator producing an output signal having a frequency determined by the tuning voltage input. Thus, the output signal of oscillator 200 is applied to the clock input of latch 210 having a Q output applied to one input of summing network 205. With the value q input to summing network 205 established by microprocessor 40 (seen in FIG. 2), an output combined signal is applied to sine wave lookup table 215. For purposes of speed and efficiency, only a predetermined number of the most significant bits within the output data of summer 205 are required for input to sine wave lookup table 215. Sine wave lookup table 215 responds to the input data at input 216 to produce a stream of digital values which are converted by slicer 218 to an output square wave or clock signal at the frequency of the sine wave produced by the values of lookup table 215. The output square wave signal from slicer 218 is applied to a divide by M frequency divider 241 which forms one input to phase detector 242.

Concurrently, the input symbol clock signal received at input 121 is frequency divided within divider 251 using a divide by N frequency division and applied to the remaining input of phase detector 242. The combination of frequency dividers 241 and 251 together with phase detector 242 is used to provide a carrier frequency for upstream communication which is locked to a network reference signal which is common to all subscriber terminals. Thus, as each transmission modulator within the cable television system uses carrier frequencies for upstream data communication which are all locked to a common network reference, the available bandwidth of upstream frequencies will be used with maximum efficiency. In the example shown in FIG. 4, the common network reference selected is that of the symbol clock signal. Thus, it is anticipated that other transmission modulators similar to transmission modulator 120 within the host cable television system will utilize different upstream carrier frequencies each locked to the common network reference provided by the symbol clock signal.

Accordingly, the values of M and N selected for frequency dividers 241 and 251 are selected to satisfy the expression $fc=fs2^M/2^N$ in which fc is the frequency of the upstream transmission carrier and fs is the frequency of the symbol clock reference signal. Phase detector 242 provides a frequency and phase comparison of the frequency divided input signals at inputs 243 and 244 and produces an output error signal representing the phase and frequency difference between the divided carrier signal and the divided symbol clock signal. This error signal is filtered by low pass filter 246 and applied to data input 248 of latch 247. Latch 247 is clocked by the symbol clock signal. The output signal of latch 247 representing the phase and frequency error signal is applied to input 206 of summing network 205. The application of the output error signal of latch 247 to input 206 of summing network 205 closes the control loop for discrete time oscillator 230 and phase lock loop 240 which operates to frequency and phase lock the carrier signal produced by discrete time oscillator 230 to the symbol clock signal.

Thus, in the event the frequency of carrier signal is less than its desired value, a positive error signal will be developed at the output of latch 247. In response, the output of summer 205 will increase at a more rapid rate thereby increasing the carrier frequency output signal of lookup table 215. Conversely, in the event the frequency of the carrier signal produced by discrete time oscillator 230 is greater than its desired value, a negative error signal will be produced at the output of latch 250 which in turn will decrease the rate of signal increase at the output of summer 205 thereby decreasing the frequency of carrier signal at the output of lookup table 215. When the carrier signal and symbol clock signal are properly phase and frequency locked, the value of error signal at the output of latch 250 will be zero.

The carrier frequency signal produced by discrete time oscillator 230 is applied to one input of modulator 265. The transmission data is properly coded by coding circuit 260 and filtered by filter 255 for application to the remaining input of modulator 265. The output of modulator 265 comprises a carrier having the carrier frequency produced by discrete time oscillator 230 modulated with the properly coded transmission data. Channel filter 264 filters the undesired modulation components from the modulated carrier signal and applies the desired modulated carrier to cable 11 (seen in FIG. 1) through programmable attenuator 266 for upstream communication.

It should be noted that the frequency of the carrier signal is controlled by programmable values of tuning voltage as well as frequency divider values M and N. Thus, the carrier frequency of transmission modulator 120 is readily established or changed using the programmable values providing substantial flexibility for the present invention upstream data transmission system.

While particular embodiments of the invention have been shown and described, it will be obvious to those skilled in the art that changes and modifications may be made without departing from the invention in its broader aspects. For example, the disclosed upstream transmission system can also be used in a network where the downstream signals are of an analog nature, or a hybrid network where some of the downstream signals are analog and some are digital. Where a decoder capable of only processing the downstream analog signals is used, the time slots would be synchronized to an appropriate reference parameter of the downstream analog signal and a downstream data channel such as the analog signal VBI (or preferably an out-of-band FM channel) would be used to download the upstream parameter values to microprocessor 40. Therefore, the aim in the appended claims is to cover all such changes and modifications as fall within the true spirit and scope of the invention.

That which is claimed is:

1. A two-way communications system for transmitting data from a central facilitity to a plurality of subscriber terminals in a downstream direction and for transmitting data from said subscriber terminals to said central facility in an upstream direction, comprising:

means in each of said subscriber terminals for defining a plurality of time slots;

means at said central facility for generating a downstream message assigning each of said time slots for reserved use by respective ones of said subscriber terminals for effecting data transmission in said upstream direction or for contentional use by all of said subscriber terminals for effecting data transmission in said upstream direction, said downstream message being generated by said central facility as a self-initiated response to one or more dynamically variable characteristics of said communications system; and means in each of said subscriber terminals for transmitting a data message in said upstream direction during one of said time slots.

2. The system of claim 1 wherein said defining means comprises means for defining said plurality of time slots synchronously with a reference parameter used to transmit data in said downstream direction.

3. The system of claim 2 wherein said reference parameter comprises a symbol clock signal.

4. The system of claim 1 wherein said one or more dynamically variable characteristics comprise the number of said subscriber terminals comprising said communications system and wherein said assigning means comprises means for assigning said time slots on the basis of said number of subscriber terminals comprising said system.

5. The system of claim 4 wherein said assigning means comprises means for assigning an increased number of said time slots for contentional use relative to those assigned for reserved use as said number of subscriber terminals comprising said system increases.

6. The system of claim 1 wherein said one or more dynamically variable characteristics comprise the amount of data message traffic in said upstream direction and wherein said assigning means comprises means for assigning said time slots on the basis of said amount of data message traffic in said upstream direction.

7. The system of claim 6 wherein said assigning means comprises means for increasing the number of said time slots assigned for contentional use relative to those assigned for reserved use as a direct function of said amount of data message traffic in said upstream direction.

8. The system of claim 1 wherein said assigning means comprises means for assigning respective transmission power levels for effecting said upstream data transmissions during said reserved and contentional time slots, said transmitting means comprising means for transmitting said upstream data message at said assigned transmission power levels.

9. The system of claim 1 wherein said assigning means comprises means for assigning a retransmission backoff algorithm for use in association with said assigned contentional time slots.

10. The system of claim 9 wherein said assigning means comprises means for increasing the retransmission backoff delay characterizing said assigned algorithm as the amount of data traffic in said upstream direction increases.

11. In a two-way communications system wherein data is transmitted from a central facility to a plurality of subscriber terminals in a downstream direction and from the subscriber terminals to the central facility in an upstream direction, each of said subscriber terminals comprising:

means for defining a plurality of time slots;

means for receiving a downstream data message from said central facility for assigning each of said time slots for use in effecting upstream transmission on either a reserved or a contention basis, said downstream data message being generated by said central facility as a self-initiated response to one or more dynamically variable characteristics of said communications system; and means operable for transmitting an upstream data message during one of said time slots.

12. The terminal of claim 11 wherein said defining means comprises means for defining said plurality of time slots synchronously with a reference parameter used to transmit data in said downstream direction.

13. The terminal of claim 12 wherein said reference parameter comprises a symbol clock signal.

14. The terminal of claim 11 wherein said one or more dynamically variable characteristics comprise the number of subscriber terminals comprising said communications system.

15. The terminal of claim 14 wherein said downstream data message is effective for assigning an increased number of said time slots for contentional use relative to those assigned for reserved use as said number of subscriber terminals increases.

16. The terminal of claim 11 wherein said one or more dynamically variable characteristics comprise the amount of data transmitted in said upstream direction.

17. The terminal of claim 16 wherein said downstream data message is effective for assigning an increased number of said time slots for contentional use relative to those assigned for reserved use as said amount of upstream data transmission increases.

18. The terminal of claim 11 wherein said receiving means comprises means for receiving a downstream data message assigning respective transmission power levels for effecting said upstream data transmissions during said reserved and contentional time slots, said transmitting means comprising means for transmitting said upstream data messages at said assigned transmission power levels.

19. The terminal of claim 11 wherein said receiving means comprises means for receiving a downstream data message assigning a retransmission backoff algorithm for use in association with said assigned contentional time slots.

20. The terminal of claim 19 wherein said receiving means comprises means for receiving a downstream data message assigning an increased retransmission backoff delay for use in association with said assigned algorithm as said amount of upstream data transmissions increase.

21. A two-way communications system for transmitting data from a central facility to a plurality of subscriber terminals in a downstream direction and for transmitting data messages from the subscriber terminals to the central facility in an upstream direction comprising:

means in each of said subscriber terminals for defining a plurality of time slots;

means at said central facility generating a self-initiated downstream message for assigning each of said time slots for upstream transmission on either a reserved or a contention basis in response to the number of subscriber terminals comprising said system and the amount of data message traffic in said upstream direction; and means in each of said subscriber terminals for transmitting an upstream data message during one of time slots.

22. The system of claim 21 wherein said defining means comprises means for defining said plurality of time slots synchronously with a reference parameter used to transmit data in said downstream direction.

23. The system of claim 22 wherein said reference parameter comprises a symbol clock signal.

24. The system of claim 21 wherein said assigning means comprises means for assigning an increased number of said time slots for contention use relative to those assigned for reserved use as said number of subscriber terminal comprising said system increases.

25. The system of claim 21 wherein said assigning means comprises means for increasing the number of said time slots assigned for contention use relative to those assigned for reserved use as a direct function of said amount of data message traffic in said upstream direction.

26. The system of claim 21 wherein said assigning means comprises means for assigning respective transmission power levels for effecting said upstream data message transmissions during said reserved and contention time slots, said transmitting means comprising means for transmitting said upstream data message at said assigned transmission power levels.

27. The system of claim 21 wherein said assigning means comprises means for assigning a retransmission backoff algorithm for use in association with said assigned contentional time slots.

28. The system of claim 27 wherein said assigning means comprises means for increasing the retransmission backoff delay characterizing said assigned algorithm as said amount of data message traffic in said upstream direction increases.

29. In a two-way communications system of the type wherein data messages are transmitted from a central facility to a plurality of subscriber terminals in a downstream direction and messages are transmitted from each of said subscriber terminals to said central facility in an upstream direction, each of the subscriber terminals comprising:

means for receiving a downstream data message from said central facility for establishing an upstream transmission mode, said downstream message being generated by said central facility as a self-initiated response to the population of subscriber units and the amount of upstream message traffic characterizing said communications system; and means for transmitting an upstream message in accordance with said established upstream transmission mode.

30. The subscriber terminal of claim 29 including means for defining a plurality of time slots and wherein said downstream data message is effective for establishing an upstream transmission mode wherein upstream data messages are transmitted at selected power levels during one or more reserved or contention time slots.

31. The subscriber terminal of claim 30 wherein said downstream data message includes a selected backoff algorithm, said transmitting means retransmitting said upstream message in one of said contention slots determined by said backoff algorithm until successfully received at said central facility.

* * * * *